Patented Apr. 14, 1942

2,279,828

UNITED STATES PATENT OFFICE 2,279,828

SOLDERING FLUX

Leo Liberthson, New York, N. Y., assignor to L. Sonneborn Sons, Inc., a corporation of Delaware No Drawing. Application December 31, 1940, Serial No. 372,496

7 Claims. (Cl. 148—25)

This invention relates to new and useful improvement in soldering fluxes.

The function of a soldering flux is primarily that of conditioning the surfaces to be soldered and does not as such become a part of the finished joint. The conditioning step, however, is of great importance as without proper conditioning deficiencies in the metallic joint result. A soldering flux should meet the following requirements:

The same should be capable of removing surface films from the work and the molten solder, should be capable of spreading over the molten solder to prevent oxidation thereof and should be comparatively cheap and easy to apply. The solder flux should, furthermore, not leave any corrosive residue or decomposition products as the result of soldering temperatures capable of injuring the joint, should be inert with respect to materials coming in contact with the joint and should be essentially non-spattering at soldering temperatures and be harmless upon contact with the skin of the worker applying the same. Finally, a soldering flux should be preferably odorless and should not contain any volatilizable matter that might give rise to the formation of objectionable or injurious fumes.

A variety of soldering fluxes are being used, both of the inorganic as well as of the organic type. There is, however, no flux presently available which possesses characteristics satisfying all the afore-enumerated requirements so that the conventionally available fluxes necessitate the making of compromises, depending upon the requirements to be met. The most widely used inorganic fluxes are those comprising inorganic salts, such as zinc chloride, ammonium chloride, magnesium chloride, aluminum chloride, or eutectic mixtures of any two or more of these. Such salts will be hereinafter referred to generically as inorganic salts of the solder flux type and when using this expression in the specification and claims, I mean thereby any one or eutectic mixture of inorganic salts commonly used as solder fluxes.

I have discovered a new and improved soldering flux substantially meeting all of the requirements for soldering fluxes hereinbefore enumerated and essentially comprising a stable dispersion of inorganic salts of the solder-flux type in a hydrocarbon vehicle substantially solid at normal temperatures, and containing a petroleum mahogany sulphonate compound. I prefer to use in accordance with the invention as the hydrocarbon vehicle, a petrolatum, either crude or refined, which, due to its particular well-known structure, composition and characteristics, is particularly adapted to contribute to the efficiency of the ultimate flux composition. Among the flux type inorganic salts I prefer to use a eutectic mixture of zinc chloride and ammonium chloride. The petroleum mahogany sulphonate compound to be used in the compounding of my new soldering flux may be either a free petroleum mahogany sulphonic acid or any alkali salt thereof, but preferably the former. The petroleum mahogany sulphonate acids or salts constitute the well-known products derived from the acid treatment of a petroleum lubricating oil distillate under sulphonating conditions.

In accordance with the invention the soldering flux contains the various components in substantially the following proportions:

40 to 60% and preferably 50% of petrolatum (crude or refined).

5 to 10% and preferably 10% of petroleum mahogany sulphonate product, preferably petroleum mahogany sulphonic acid.

The remainder a concentrated aqueous solution of an inorganic salt of the solder flux type and preferably of a eutectic mixture of zinc chloride and ammonium chloride.

The foregoing components of the flux composition in accordance with the invention are preferably compounded by first melting together the mahogany sulphonate and the petrolatum until a substantially homogeneous product is obtained aided by agitation, if necessary. The concentrated aqueous solution of the inorganic salts of the solder flux type are then slowly added to the petrolatum mahogany sulphonic acid product maintaining the temperature sufficiently high to assure fluidity of the mass. Upon cooling, the resulting product constitutes a substantially solid substance of a consistency comparable to that of the petrolatum originally used.

The foregoing description is by way of illustration and not of limitation and I am not to be limited to any details but only by the appended claims in which I have endeavored to claim broadly all inherent novelty.

I claim:

1. A soldering flux essentially comprising a substantially stable dispersion of at least one inorganic salt of the solder-flux type in a hydrocarbon vehicle substantially solid at normal temperatures and containing at least one member of the group consisting of petroleum mahogany sulphonic acid and alkali petroleum mahogany sulphonate.

2. A soldering flux in accordance with claim 1 in which said hydrocarbon vehicle is petrolatum and in which said dispersion is a dispersion of an aqueous solution of said inorganic salt.

3. A soldering flux comprising substantially 40 to 60% petrolatum, substantially 5 to 10% petroleum of at least one member selected from the group consisting of petroleum mahogany sulphonic acid and alkali petroleum mahogany sulphonate, and substantially 30 to 55% of a substantially concentrated aqueous solution of at least one inorganic salt of the solder-flux type.

4. A soldering flux comprising substantially 40 to 60% petrolatum, substantially 5 to 10% petroleum of at least one member selected from the group consisting of petroleum mahogany sulphonic acid and alkali petroleum mahogany sulphonate, and substantially 30 to 55% of a substantially concentrated aqueous solution of a eutectic mixture of zinc chloride and ammonium chloride.

5. A soldering flux comprising substantially 50% petrolatum, substantially 10% petroleum mahogany sulphonic acid, and substantially 40% of a substantially concentrated aqueous solution of a eutectic mixture of zinc chloride and ammonium chloride.

6. Method of preparing a soldering flux comprising incorporating into substantially 40 to 60 parts of petrolatum, containing substantially 5 to 10 parts of at least one member of the group consisting of petroleum mahogany sulphonic acid and alkali petroleum mahogany sulphonate, with agitation and under conditions assuring fluidity of said petrolatum, 30 to 50 parts of a substantially concentrated aqueous solution of at least one inorganic salt of the solder flux type to thereby obtain a substantially stable dispersion of said inorganic salt in said petrolatum.

7. Method in accordance with claim 6 in which said conditions assuring fluidity of said petrolatum comprise substantially maintaining a temperature above the melting point of said petrolatum.

LEO LIBERTHSON.